UNITED STATES PATENT OFFICE.

SUSAN M. BUCHANAN, OF HUBBARD, OREGON.

DEODORIZING COMPOUND.

No. 877,401.     Specification of Letters Patent.     Patented Jan. 21, 1908.

Application filed July 31, 1907. Serial No. 386,417.

*To all whom it may concern:*

Be it known that I, SUSAN M. BUCHANAN, a citizen of the United States, residing at Hubbard, in Marion county, State of Oregon, have invented a new and useful Deodorizing Compound, of which the following is a specification.

My composition is prepared from the following ingredients, combined in the proportions stated, to-wit:

Water, substantially pure_____2 gallons.
    *Anaphalis margaritacea* (ever-
      lasting) flowers, dried_____1 pound.
    Wheat flour_____½ ounce.

These ingredients are to be compounded and thoroughly mingled in the following manner: Place the pound of dried everlasting flower in the two gallons of water (cold), contained in a suitable vessel, and heat gradually to the boiling point, then allow the liquid to simmer for 6 or 7 hours. At the expiration of such time, while it is yet warm, place the product in a cloth, through which the liquid should be squeezed. Put the liquid thus obtained into a suitable vessel and boil again until the liquid is reduced to about one half pint or becomes of syrupy consistency. Then while it is still warm, stir in the half ounce of wheat flour and at the same time permit the liquid to evaporate until the product results finally in a dark colored, heavy and sticky gummy product of about 8 or 12 ounces in weight. The said gummy product constitutes my deodorizer, ready for use.

In using the above described composition, it may be dissolved in water in such quantities as may be desired, or it may be dried to a powder and used in that form. It may also be used in the gummy state just as prepared. In either case, it may be employed as a deodorizer of odors, which although offensive, may not be injurious, and thus has a particular use, for which there is a daily want. The composition may also be used in the same manner to purify the breath, and it is harmless to the human organism.

I am not aware that all of the ingredients of my composition, in the proportions stated, have been used together.

What I claim, and desire to secure by Letters Patent of the United States, is:—

1. A deodorizing composition consisting of a mixture of a decoction of the dried flowers of *Anaphalis margaritacea* of viscous consistency and wheat flour, substantially as described.

2. A deodorizing composition consisting of a mixture of about 8 to 12 parts of a decoction of the dried flowers of *Anaphalis margaritacea* and one half part of wheat flour, substantially as described.

SUSAN M. BUCHANAN.

Witnesses:
    W. T. GRIMM,
    IVAN GRIMM.